(12) United States Patent
Günnel et al.

(10) Patent No.: US 11,105,410 B2
(45) Date of Patent: Aug. 31, 2021

(54) TRANSMISSION DEVICE AND OIL GUIDANCE STRUCTURE PROVIDED THEREIN

(71) Applicant: SCHAEFFLER TECHNOLOGIES AG & CO. KG, Herzogenaurach (DE)

(72) Inventors: Ronny Günnel, Hirschaid (DE); Andreas Grein, Wilhermsdorf (DE); Zoltan Kalmar, Nuremberg (DE); Philip Wurzberger, Nuremberg (DE); Swen Dörrie, Herzogenaurach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 41 days.

(21) Appl. No.: 16/607,570

(22) PCT Filed: Feb. 19, 2018

(86) PCT No.: PCT/DE2018/100143
§ 371 (c)(1),
(2) Date: Oct. 23, 2019

(87) PCT Pub. No.: WO2018/196902
PCT Pub. Date: Nov. 1, 2018

(65) Prior Publication Data
US 2020/0132183 A1 Apr. 30, 2020

(30) Foreign Application Priority Data
Apr. 25, 2017 (DE) .................... 10 2017 108 748.6

(51) Int. Cl.
*F16H 57/04* (2010.01)
*F16H 37/04* (2006.01)
(Continued)

(52) U.S. Cl.
CPC ......... *F16H 57/0409* (2013.01); *F16H 37/04* (2013.01); *F16H 57/037* (2013.01);
(Continued)

(58) Field of Classification Search
None
See application file for complete search history.

(56) References Cited

U.S. PATENT DOCUMENTS

| | | | |
|---|---|---|---|
| 5,085,100 A | 2/1992 | Duello | |
| 7,556,581 B2 * | 7/2009 | Moon | .................... B60T 1/062 475/160 |

(Continued)

FOREIGN PATENT DOCUMENTS

| | | | |
|---|---|---|---|
| DE | 102008058873 A1 | 5/2010 | |
| DE | 102009011734 A1 | 9/2010 | |

(Continued)

*Primary Examiner* — Colby M Hansen
(74) *Attorney, Agent, or Firm* — Dickinson Wright PLLC

(57) ABSTRACT

A transmission device is provided having a transmission housing, a gear set received in the transmission device having a first gear wheel, which is rotatable about a first gear wheel axis, and a second gear wheel, which engages the first gear wheel and is rotatable abut a second gear wheel axis. In a lateral region of the first gear wheel, there is an oil guidance structure, which is designed as a component produced separately from the transmission housing, and comprises an orifice segment extending radially to the first gear wheel axis, and extends at least in part about the first transmission axis and forms a first lateral surface facing the gear wheel, leaving an intermediate space.

14 Claims, 3 Drawing Sheets

(51) Int. Cl.
*B60K 1/00* (2006.01)
*F16H 57/037* (2012.01)
(52) U.S. Cl.
CPC ..... *F16H 57/0423* (2013.01); *F16H 57/0471* (2013.01); *F16H 57/0483* (2013.01); *F16H 57/0493* (2013.01); *F16H 57/0495* (2013.01); *B60K 1/00* (2013.01); *B60K 2001/001* (2013.01); *F16H 57/0453* (2013.01)

(56) References Cited

U.S. PATENT DOCUMENTS

| | | | | |
|---|---|---|---|---|
| 8,708,858 | B2* | 4/2014 | Li | H02K 53/00 |
| | | | | 475/267 |
| 8,961,361 | B2* | 2/2015 | Ishizuka | B60K 17/046 |
| | | | | 475/331 |
| 2017/0030457 | A1 | 2/2017 | Hotait et al. | |

FOREIGN PATENT DOCUMENTS

| | | |
|---|---|---|
| DE | 102010034130 A1 | 2/2012 |
| DE | 102013018712 A1 | 5/2015 |
| DE | 112014002195 T5 | 1/2016 |
| EP | 2700849 A1 | 2/2016 |
| JP | 2011256918 A | 12/2011 |
| WO | 2015146633 A1 | 10/2015 |

* cited by examiner

TRANSMISSION DEVICE AND OIL GUIDANCE STRUCTURE PROVIDED THEREIN

CROSS-REFERENCE TO RELATED APPLICATIONS

This application is the U.S. National Phase of PCT/DE2018/100143 filed Feb. 19, 2018, which claims priority to DE 102017108748.6 filed Apr. 25, 2017, the entire disclosures of which are incorporated by reference herein.

TECHNICAL FIELD

This disclosure relates to a transmission device having a transmission housing, which has a bottom region and a first and second side wall region, a gear set accommodated in the transmission housing and having a first gearwheel, which is rotatable about a first gearwheel axis, and a second gearwheel, which engages radially from the outside in the first gearwheel and is rotatable about a second gearwheel axis. The disclosure furthermore also relates to an oil guidance structure for a transmission device of this kind, wherein this oil guidance structure is inserted into the transmission housing as an insert, produced separately from the transmission housing, in the context of the assembly of the transmission device.

BACKGROUND

DE 10 2010 034 130 A1 discloses a transmission device which as such forms a component part of an electromechanical drive system of a motor vehicle. The transmission device comprises a transmission housing produced in the form of a pot, in which an axle differential and, arranged axially parallel to the latter, a planetary transmission stage are arranged. In this arrangement, the axle differential carries a first spur gear, which engages radially from the outside in a second spur gear, which is coupled to the planet carrier of the planetary transmission stage.

It is an underlying object of the disclosure to provide a transmission device of the abovementioned type which is distinguished in operation by high mechanical efficiency and in which tribological requirements are reliably satisfied in the region of bearing locations within the transmission and of tooth contact zones, even in the case of unfavorable operating conditions, e.g. continuously low driving speed or high longitudinal accelerations and sustained transverse accelerations of a corresponding vehicle.

SUMMARY

According to embodiments, a transmission device has:
- a transmission housing, which has a bottom region and a first and second side wall region,
- a gear set accommodated in the transmission housing and having a first gearwheel, which is rotatable about a first gearwheel axis, which is aligned substantially parallel to the bottom region, and
- a second gearwheel, which engages in the first gearwheel and is rotatable about a second gearwheel axis, which in turn extends parallel to the first gearwheel axis, wherein
- in a side region of the first gearwheel, there is an oil guidance structure, which is embodied as a component produced separately from the transmission housing,
- the oil guidance structure comprises a first orifice segment, which is extended radially with respect to the first gearwheel axis and extends at least partially around the first transmission axis and, in doing so, forms a first side face facing the first gearwheel,
- the first orifice segment is bounded by an inner edge and an outer edge,
- the distance between the inner edge of the first orifice segment and the first axis is smaller than the radius of the root circle of the first gearwheel,
- the contour of the outer edge of the first orifice segment is of complementary design to the inner contour of the adjacent bottom region, and
- the oil guidance structure is positioned in the transmission housing in such a way that an intermediate space remains between the first gearwheel and the first side face of the first orifice segment, said face facing the first gearwheel.

This makes it possible in an advantageous way to screen off the side region of a gearwheel from the adjacent interior space of a transmission housing at least partially, in particular in the sump region, and thereby to adjust the oil take up by the gearwheel and to achieve sufficient lubrication in the region of the tooth contact zones and of the bearing locations, even in the event of a reduced oil flow. The oil guidance structure can be produced as an inserted component or insert, which is inserted into the housing in the context of the assembly of the transmission. In particular, the inserted component can be produced as a plastic part or even as a plastic-metal composite component. The inserted component can enter and be fixed in the flange region between housing components, it can be seated as an insert in the transmission housing and it can also be attached to a flange seal, in particular being formed integrally with the latter.

According to an embodiment, the oil guidance structure may be configured in such a way that the distance between the outer edge of the first orifice segment and the first axis is greater than the root circle radius of the first gearwheel. This makes it possible to screen off the side region of the gearwheel, situated between the root circle of the gearwheel and the gearwheel shaft region, from the rest of the interior space of the transmission housing. Here, the first side face of the orifice segment can advantageously be configured in such a way that it comprises a wall which surrounds the transmission axis in the form of the lateral surface of a cone. As an alternative or even in combination with this approach, it is also possible to configure the oil guidance structure in such a way that the first side face of the orifice segment comprises a plane surface.

The first orifice segment may be dimensioned in such a way that it extends in the form of a continuous annular or plate rim around the first gearwheel axis. However, it is also possible to design the orifice segment to be restricted to the peripheral angles which include the oil sump region.

The oil guidance structure can be embodied as a spectacle-like insert, with the result that the first orifice segment is adjoined by a second orifice segment, which extends around the second gearwheel axis in the manner of a continuous ring. At least one of the orifice segments, in particular the orifice segment which surrounds the smaller gearwheel in respect of the tip circle diameter of the latter, can be configured in such a way that it carries a half shell section which extends close to the region of engagement of the two gearwheels, rises from the corresponding orifice segment in an axial direction in the direction of the gearwheel axes and bounds the tip circle of the directly adjacent gearwheel while leaving an intermediate space. The gearwheels of the gear set may be embodied as spur gears with helical toothing.

The half shell section can advantageously be configured in such a way that it forms an inner wall of a semi-arcuate hollow body curved in the manner of a semi-arc around the second gearwheel axis. This semi-arcuate hollow body can act as a dynamic reservoir which receives some of the lubricating oil during a high-speed operating mode and thus contributes to lowering the sump level. Oil can be discharged selectively from this reservoir via specially dimensioned and aligned passages and openings into those regions which have a higher lubricant requirement.

The oil guiding orifice can be designed as a flat orifice. To improve the sealing effect between the oil guiding orifice and the aluminum housing, a rubber-type sealing lip can be provided as a tolerance compensator. This rubber-type sealing lip can be produced either as a 2K injection molded structure or as a fitted sealing profile.

According to another embodiment, the oil guidance structure can be configured in such a way that a space filling structure rises on an orifice segment rear side facing away from the first side face of the first orifice segment, said space filling structure rising axially from said rear side in the direction of the first gearwheel axis. This space filling structure can be produced as a hollow body structure, e.g. with a foam or honeycomb core. In terms of its axial structure, the space filling structure can furthermore advantageously be designed to be complementary to the inner wall of an adjacent, fixed housing part and, at the same time, can serve or at least contribute to the fixing or support of the oil guidance structure in the transmission housing.

It is furthermore advantageously possible for the first orifice segment to be configured in such a way that it forms an inner collar, which extends in a direction away from the first gearwheel toward a bearing device, which supports the first gearwheel or a transmission structure carrying the first gearwheel. In this case, the first gearwheel can fit around an axle differential, for example, wherein this axle differential, in turn, may be produced as a spur gear differential.

The oil guidance structure may be arranged in an intermediate region between the first gearwheel and the first side wall region of the transmission housing. This first side wall region can form a side cover of an electric motor, the rotor of which is situated on a side of the side cover facing away from the second gearwheel. The side cover can be reinforced internally with cast ribs, wherein the oil guidance structure provides positioning structures which extend in that intermediate region cast ribs of the transmission housing. The positioning structures formed on the oil guidance structure may be of complementary design to these cast ribs and enter the intermediate space defined between these cast ribs.

The transmission housing may be manufactured from a metal material, in particular an aluminum alloy. The oil guidance structure may be manufactured as a plastic injection molding. However, it can also be manufactured as a formed sheet metal part, as a metal-plastic composite component or even as some other metal part or as a sandwich component.

The oil guidance structure according to embodiments of this disclosure is suitable particularly for transmission devices for electromechanical drive systems having an electric motor, a reduction gear assembly and an axle differential, wherein the central axes of these two component transmissions are aligned parallel to one another. The drive system is installed in a corresponding motor vehicle in such a way that said central axes are substantially parallel to the roadway and, in turn, may be transverse to the longitudinal direction of the vehicle. The electric motor and the reduction gear assembly, which is embodied as an epicyclic transmission, are arranged coaxially with a common main axis. The rotor of the electric motor is accommodated in a housing section which is outside the transmission housing side part acting as a bearing plate for the electric motor. This bearing plate also carries the bearing region for the differential. The other housing half of the transmission comprises the transmission and the differential as well as an oil sump below the differential. The bearing plate and the adjoining housing components of the transmission may be connected to one another by a flange joint.

The bearing plate, i.e. the side part of the transmission housing, in particular the bearing plate of the electric motor but also the section thereof for the differential, have a surface which is highly structured on the inside. Such structures act as cooling ribs, support ribs, reinforcements or production-related undercuts. The cavities formed in this structuring can collect and possibly hold the splashed oil. Since the oil quantity stored in the oil sump is relatively small (keeping down splash losses), this can lead to inadequate availability of lubricating oil in the system. The concept ensures that, on the one hand, there is sufficient lubricating oil available for the transmission without excessive lubricating oil from the oil sump being distributed by splashing into dead spaces via the differential in the cavity surrounded by the second housing half during driving. On the contrary, the hollow body can be used to collect splashed oil and to feed it in a defined manner to relevant lubrication points. The oil guidance structure provides a cover plate within the transmission which covers the highly structured surface of the transmission housing on the inside.

The concept according to the disclosure makes it possible to make available additional collecting or capturing structures on the inside, by means of which splashed oil, in particular the oil flung onto the "roof" of the transmission housing, can be collected via a collecting structure at a level above the sump level. A container-type structure provided for this purpose, for example, has an opening in the bottom, through which the collected oil can be fed back selectively onto the surface of the rotating differential, onto the region of engagement of gearwheels or in the direction of the oil sump. Other orientations are also conceivable. The cover plate is either attached separately to the flange joint or is integrated into the flange joint. To ensure that the splashed oil does not get into the cavities between the cover plate and the bearing plates, the joint can also be provided with a seal.

The oil guiding orifice may separate the two housing halves of the transmission to the effect that, to ensure the tribology/cooling of the transmission components under extreme driving conditions, there is always sufficient oil enclosed in the transmission bell housing and the oil does not get lost in the ribbed cast structure of the electric machine housing under high transverse accelerations (cornering) and is thus withdrawn from the oil circuit.

The oil guidance structure according to the disclosure is suitable particularly for drive systems such as electric axles with axially parallel arrangement of the differential or even coaxial arrangement. It makes it possible to cover highly structured surfaces within the housing and thus to improve lubricating oil distribution. In this context, the oil guidance structure according to embodiments can be implemented as an insert which fills the cavities of a transmission housing in the region surrounding a gearwheel with filling body sections.

The oil guidance structure according to the disclosure can be provided on the rear side of the cover plate with filling bodies which are formed integrally with the cover plate and which have the positive or at least approximately complementary profile to the cavities. In the assembled condition, the volumes of the filling bodies fill the cavities, ensuring that no space for lubricating oil remains in these zones.

BRIEF DESCRIPTION OF THE DRAWINGS

Further details and features of embodiments of the disclosure will become apparent from the following description in conjunction with the drawing. In the drawings.

DETAILED DESCRIPTION OF THE DRAWINGS

Figure 1:
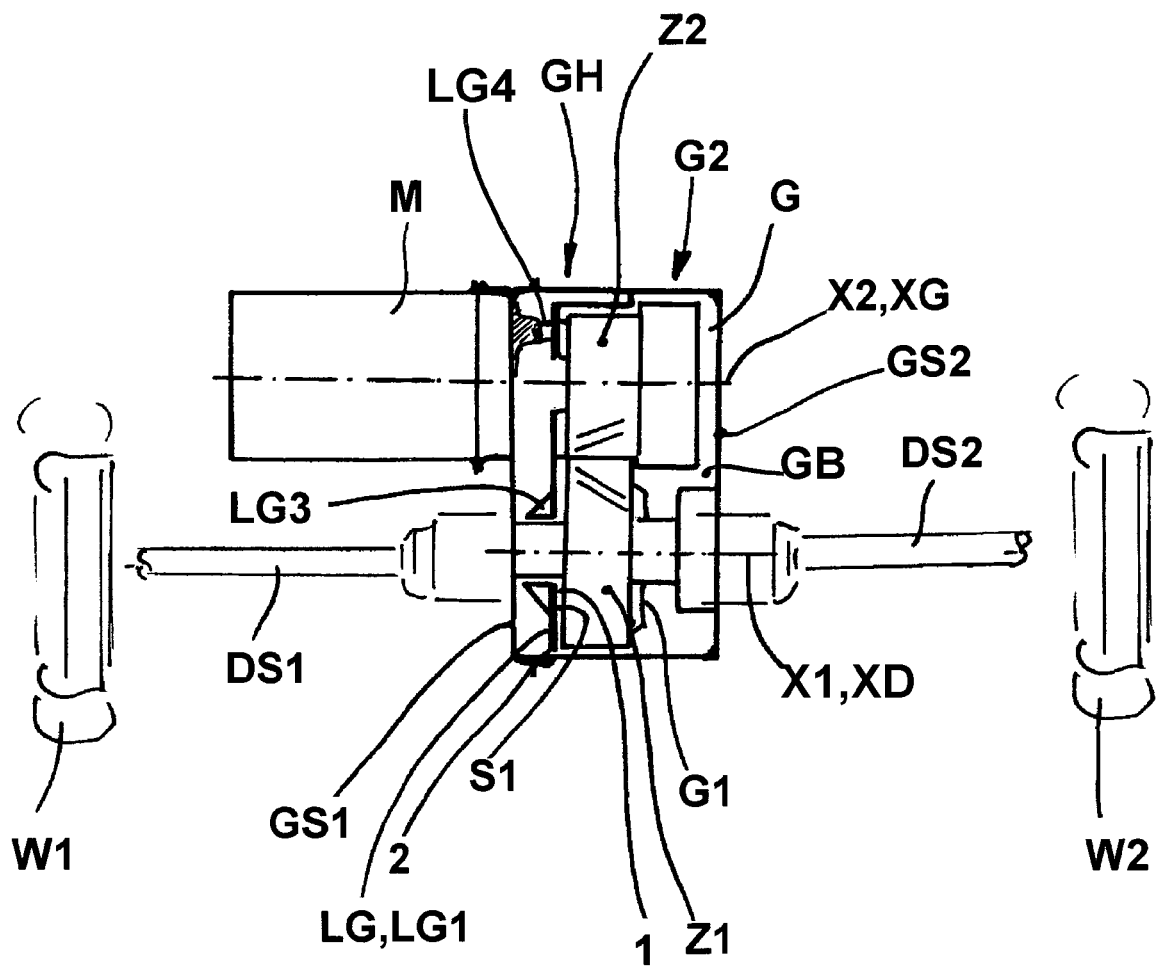
FIG. 1 shows a schematic illustration intended to illustrate the construction of an electromechanical vehicle drive having a transmission device according to an embodiment with a fixed oil guidance structure embodied as an insert provided therein.

The illustration in FIG. 1 illustrates the construction of an electromechanical drive device for a motor vehicle in the form of a schematic illustration. This comprises a drive motor M, a transmission device G having an axle differential G1 and a component transmission G2 acting as a reduction gear assembly, drive shafts DS1, DS2 and driven wheels W1, W2.

Here, the axle differential G1 is embodied as a spur gear differential of axially narrow construction. Component transmission G2 is likewise embodied as an epicyclic transmission. Power transfer from component transmission G2 to the axle differential G1 takes place via a gear set comprising a first gearwheel Z1 and a second gearwheel Z2. The first gearwheel Z1 is mounted rotatably about a first gearwheel axis X1, which also forms the differential axis XD. The second gearwheel Z2 is mounted rotatably about a second gearwheel axis X2. This second gearwheel axis X2 also corresponds to the transmission axis XG of the first component transmission G2 and is in alignment with the axis of a rotor of the electric motor M. In this case, the installation of the drive device in a motor vehicle is performed in such a way that the axes X1, X2 of the gearwheels Z1, Z2 are substantially parallel to the plane of the roadway and transverse to the longitudinal direction of the vehicle.

The transmission device G comprises a transmission housing GH, which has a bottom region GB and a first and second side wall region GS1, GS2. The illustration under consideration is a plan view from a viewing axis substantially perpendicular to the roadway. Here, the motor M may be situated at the end of the drive shafts DS1, DS2 adjacent to the vehicle center. The transmission housing GH houses the gear set provided to couple the first component transmission G2 to the axle differential G1, said gear set comprising the first gearwheel Z1, which is rotatable about the first gearwheel axis X1, and the second gearwheel Z2, which engages radially from the outside in the first gearwheel Z1 and is rotatable about the second gearwheel axis X2, which is parallel to the first gearwheel axis X1.

In a side region of the first gearwheel Z1, said region being on the left in this illustration, there is an oil guidance structure LG, also referred to as an oil guide, which is formed as a component produced separately from the transmission housing GH. This oil guidance structure LG comprises a first orifice segment LG1, which extends at least partially around the first gearwheel axis X1 and, in doing so, forms a first side face S1 facing the first gearwheel Z1.

The first orifice segment LG1 is bounded by an inner edge 1 and an outer edge 2. The distance between the inner edge 1 of the first orifice segment LG1 and the first axis X1 is smaller than the radius of a root circle (e.g., center hole or inner diameter) of the first gearwheel Z1. The distance between the inner edge 2 of the first orifice segment LG1 and the first axis X1 is greater than the root circle of the first gearwheel Z1. The contour of the outer edge 2 of the first orifice segment LG1 is of complementary design to the inner contour of the adjacent bottom region GB. The oil guidance structure LG comprises fastening sections LG3, LG4 for positioning the first orifice segment LG1 in such a way that an intermediate space remains between the side face of the first gearwheel Z1 and the first side face of the first orifice segment LG1, said face facing the first gearwheel.

Here, the first gearwheel Z1 fits around the epicyclic gear housing of the axle differential G1, which is here produced as a spur gear differential. In this embodiment, the oil guidance structure LG is situated in an intermediate region between the first gearwheel Z1 and the first side wall region GS1 of the transmission housing OH, the side wall region adjacent to the motor M. It is also possible for the oil guidance structure LG to be arranged in the side region of the first gearwheel Z1 facing away from side wall region GS1. It is also possible for two such oil guidance structures to be arranged on the two sides of the spur gear differential.

Figure 2:
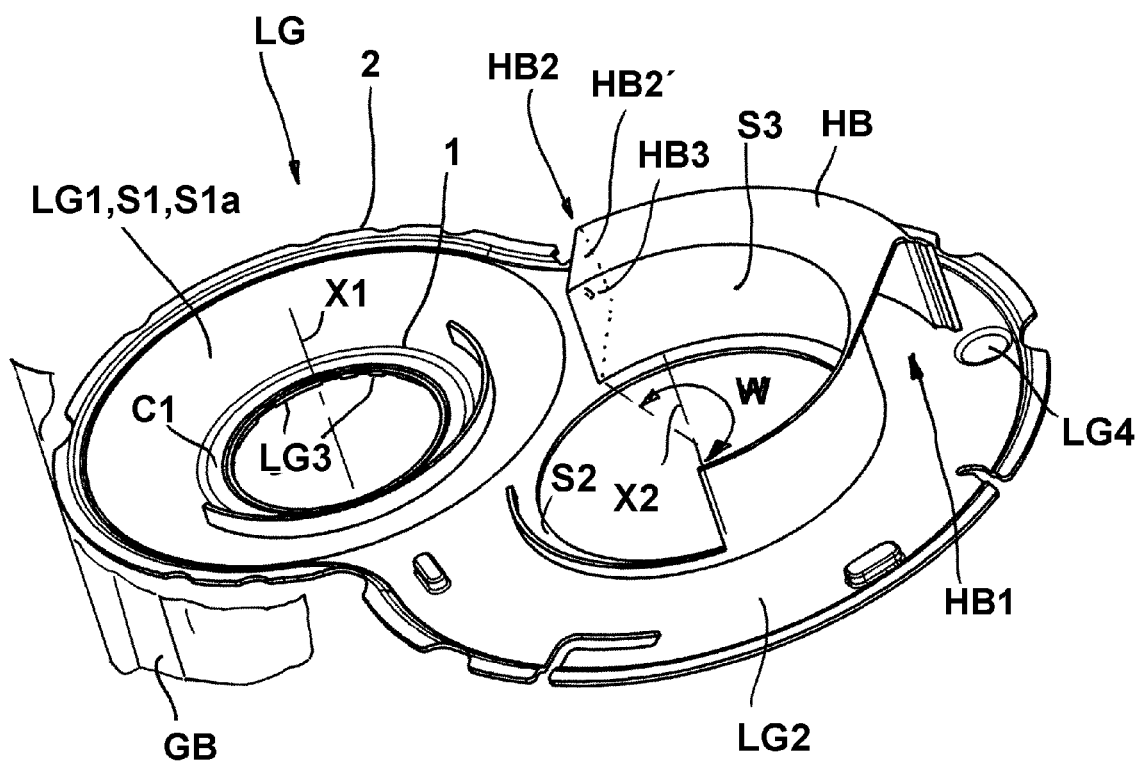
FIG. 2 shows a perspective illustration of an oil guidance structure for a transmission device of an electromechanical drive device, in particular as per FIG. 1.

The illustration in FIG. 2 illustrates, in the form of a perspective illustration, the construction of one embodiment of an oil guidance structure LG of the kind that can be used in a drive system shown in FIG. 1.

This oil guidance structure LG is embodied as a component which is initially produced separately from the transmission housing GH and is inserted in the housing of a corresponding transmission device in the context of the assembly of said device. As already explained above, this oil guidance structure LG comprises a first orifice segment LG1, which extends at least partially around the first transmission axis X1 and, in doing so, forms a first side face S1 facing the first gearwheel Z1, not shown specifically here.

The first orifice segment LG1 is bounded by an inner edge 1 and an outer edge 2. The distance between the inner edge 1 of the first orifice segment LG1 and the first axis X1 is smaller than the radius of the root circle of the first gearwheel Z1. The distance between the outer edge 2 of the first orifice segment LG1 and the first axis X1 is greater here than the root circle of the first gearwheel Z1. The contour of the outer edge 2 of the first orifice segment LG1 is of complementary design to the inner contour of the adjacent bottom region GB—shown only indicatively here—of the transmission housing.

The oil guidance structure LG comprises a plurality of fastening sections LG3, LG4 for positioning the first orifice segment LG1 in such a way that an intermediate space remains between the first gearwheel Z1 and the first side face S1 of the first orifice segment LG, said face facing the first gearwheel.

In the illustrative embodiment shown here, the first side face S1 of the orifice segment is configured in such a way that it comprises a funnel surface S1$a$ aligned radially with respect to the first transmission axis. The first orifice segment LG1 is furthermore configured in such a way that it extends in the form of a continuous ring or annular disk around the first gearwheel axis X1.

Adjoining the first orifice segment LG1 there is here a second orifice segment LG2, which extends in the form of a continuous ring around the second gearwheel axis X2 and carries a section which is here configured as a plane surface S2 and rises radially above the tip circle of the second gearwheel Z2 (cf. FIG. 1). The second orifice segment LG2 of the oil guidance structure LG carries a half shell section S3 in the form of a cylinder segment, which rises from the second orifice segment LG2 in the direction of the toothing of the second gearwheel axis X2 and which bounds the tip circle of the second gearwheel Z2 while leaving a radial gap and an intermediate space corresponding thereto.

The half shell section S3 forms an inner wall of a semi-arcuate hollow body HB curved in the manner of a semi-arc around the second gearwheel axis. The half shell section S3 is configured as a cylinder segment. In the installed position of the oil guidance structure LG according to an embodiment, this semi-arcuate hollow body HB is situated at least predominantly above the oil sump level of the transmission and forms a first end section HB1 and a second end section HB2. The first end section HB1 forms a collecting inlet for collecting the oil thrown up from the second gearwheel Z2 during the forward motion of a corresponding vehicle (cf. FIG. 1). The second end section HB2 is substantially closed via an end wall HB2' (shown as hidden here) and, with the rest of the inner wall of the semi-arcuate hollow body HB, delimits a collecting chamber. The oil can run out of this collecting chamber via the restriction hole HB3. This is situated vertically above the tooth engagement region of the two gearwheels Z1, Z2, and the correspondingly outflowing oil stream thus enters precisely this tooth engagement region and wets the contact surfaces of the teeth with lubricant. The semi-arcuate hollow body HB extends over a peripheral region of the second gearwheel Z2 of at least 60°, in this case almost 200°.

The first orifice segment LG1 furthermore forms an inner collar C1, which extends in a direction away from the first gearwheel toward a bearing device (not shown specifically), which supports the first gearwheel Z1 or the epicyclic gear housing of a differential which carries this first gearwheel Z1.

In particular, the oil guidance structure LG shown in the illustration according to FIG. 2 can be arranged in a drive system according to FIG. 1 in the arrangement—indicated schematically there—in a transmission device. The lower rim region of the oil guidance structure, that pointing toward the observer in the illustration shown in FIG. 2, then closely follows the inner wall of the transmission housing bottom GB.

The positioning and fixing of the oil guidance structure in the transmission housing can be accomplished via a plurality of contact points with the transmission housing and fixed components of the transmission. Thus, the structures rising axially on the rear side of the first segment S1 can be positioned on the transmission housing wall and on ribs formed thereon. The fastening sections LG3 arranged in the inner region of the inner collar C1 of the orifice segment LG1 can engage behind a bearing inner ring of a rolling bearing, the bearing outer ring of which supports the epicyclic gear housing of the differential G1. The fastening section LG4 that can be seen here, which is formed on the rear side of the second oil guidance segment LG2, can carry a plug-in peg, which can be inserted into a hole in the transmission housing.

The concept according to embodiments of this disclosure is suitable especially for use in modern electric axle drives and makes it possible to accomplish the oiling of the individual transmission stages via gravity oiling without an additional pump. This has the advantage that costs, installation space and weight can be saved through the elimination of an oil pump. Via the oil guidance structure according to the disclosure, it is ensured that reliable lubrication is achieved even in the case of extreme driving maneuvers (e.g. rapid, sustained cornering). In the case of conventional designs, conventional gravity oiling comes up against its technical limits in these operating conditions, owing to the transverse acceleration. The concept according to the disclosure avoids oil collecting predominantly in existing cavities (e.g. between the reinforcing ribs of the cast housing) of the transmission owing to the centripetal force. The oil thus remains available to the normal oil circuit. This makes it possible, in particular, to fill the transmission with only a low lubricant level. This results in a reduction in oil turbulence and splash losses, even during normal driving.

Figure 3:
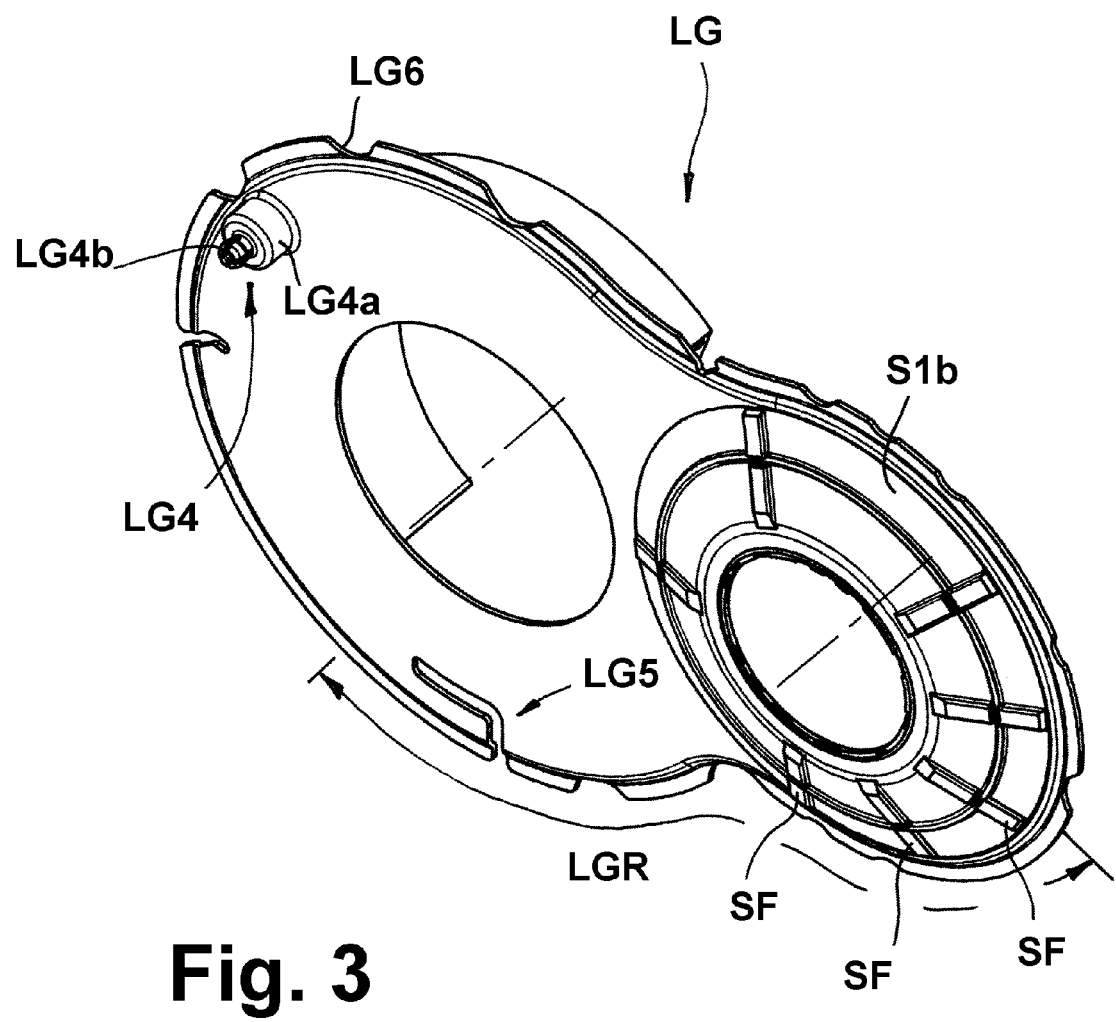
FIG. 3 shows another perspective illustration of the oil guidance structure according to FIG. 2, viewed from the rear side, intended to illustrate further advantageous technical details, in particular details on the axial positioning and anchoring of the oil guidance structure.

The illustration in FIG. 3 illustrates the construction of the oil guidance structure LG according to the disclosure in the region of its rear side S1$b$, said rear side facing away from the associated gearwheels and thus facing the transmission housing side wall. A plurality of profiles SF, which reinforce the oil guidance structure LG and furthermore assist the positioning of the oil guidance structure LG on the transmission housing in the installed position, is formed in the region of this rear side S b. A further fastening structure LG4, which here comprises a stem LG4$a$ configured as a hollow cylindrical peg, and a clamping head LG4$b$, is provided in a rear-facing region of the second orifice segment LG2. During the fitting of the oil guidance structure LG, the clamping head LG4$b$ can be pressed into a hole provided in a corresponding position in the transmission side cover.

As is particularly clear from this illustration, the rim region LGR of the oil guidance structure LG, which is adjacent to the transmission housing bottom GB (cf. FIG. 1), is contoured in a manner complementary to the inner wall of the transmission housing bottom GB, and therefore there are as far as possible no gaps remaining between the transmission housing bottom and the oil guidance structure, or at least only gaps sufficiently small for adequate restriction of additional oil inflow. It is possible to further assist sealing via a fitted or integrally molded elastomer structure.

Apertures LG5 and recesses LG6, through which structures of the transmission housing or other inserts of the transmission housing can project, can be provided on the oil guidance structure. It is also possible to implement other geometries on the oil guidance structure LG, via which the fixing and positioning of the oil guidance structure in the transmission housing can be achieved or assisted. It is also possible to arrange a plurality of such oil guidance structures in the transmission housing, which may have connecting or positioning sections that interact with one another, in particular that can be assembled together or come to rest against one another. Thus, two oil guidance structures according to embodiments can also be assembled to form a box, the inner walls of which at least partially partition off the side walls of at least one gearwheel enclosed between the oil guidance structures from the oil sump.

The disclosure results in an improvement in component oiling, even in the case of extreme driving maneuvers, without significant extra filling of the transmission with oil. Moreover, the oil is available quickly and in a targeted way in the required transmission regions at risk of wear. A reduction in oil swirling between the housing ribs and the circulating oil is achieved. The oil guidance structure according to embodiments provides a smooth cover for the inner cast ribs of a transmission housing, e.g. the end shield of an electric machine, and reduces oil turbulence. Furthermore, there is a reduction or elimination of the dead volume in the lower region of the electric machine end shield by virtue of a closed hollow body structure. The oil guidance structure according to embodiments can furthermore form oil guiding lips for the control and accumulation of the oil volume flow delivered upward by a parking lock wheel of a differential stage.

The oil guidance structure can furthermore form a collecting shell for receiving the oil not transferred into the oil passages of the transmission housing. The oil guidance structure allows selective return of the oil from the collecting shell, via an outlet opening, into the contact region between the outer toothing of the differential and planet stage for renewed upward delivery to the transfer points to the oil passages in the transmission housing and thus supports a closed circuit function.

The oil guidance structure according to the disclosure can be provided with sealing lips which bring about at least a large degree of sealing of the adjacent side region of the transmission housing, ensuring that there is no increase in oil inflow from there, even at high transverse accelerations.

Via the oil guidance structure according to embodiments of this disclosure, it is also possible to implement other oil guidance functions in the transmission. The oil guidance structure provides a smooth cover for the cast ribs and reduces or eliminates the dead volume. The displacement structures can be produced in a weight saving manner as a honeycomb structure. The oil guidance structure can be provided with oil guiding lips which offer a buildup and guidance function for the oil flow. The collecting shell makes it possible to collect unused dripping oil and to move it to a lubrication point. The oil guidance structure according to the disclosure allows a defined outflow of the collected oil and thus supports a circuit function. The oil guidance structure according to the disclosure is suitable, in particular, for use in axially parallel front axle transmissions (APA) and brings about an improvement in oiling. In the case of pronounced internal housing ribbing, the oil guidance structure can furthermore optimize efficiency.

The invention claimed is:

1. A transmission device comprising:
   a transmission housing which has a bottom region and a first and second side wall region,
   a gear set accommodated in the transmission housing and having a first gearwheel which is rotatable about a first gearwheel axis, and
   a second gearwheel which engages the first gearwheel and is rotatable about a second gearwheel axis, which extends parallel to the first gearwheel axis,
   wherein,
      in a side region of the first gearwheel, there is an oil guidance structure, which is formed as a component produced separately from the transmission housing,
      the oil guidance structure comprises a first orifice segment, which extends at least partially around the first gearwheel axis and, in doing so, forms a first side face facing the first gearwheel,
      the first orifice segment is bounded by an inner rim and an outer rim,
      a distance between the inner rim of the first orifice segment and the first gearwheel axis is smaller than a radius of an inner diameter of the first gearwheel,
      the oil guidance structure is arranged in such a way that an intermediate space remains between the first gearwheel and the first side face of the first orifice segment, said first side face facing the first gearwheel,
      the first orifice segment is adjoined by a second orifice segment which extends around the second gearwheel axis in the manner of a continuous ring
      the second orifice segment carries a half shell section which extends from the second orifice segment in a direction of the second gearwheel axis and which bounds a tip circle of the second gearwheel while leaving an intermediate space, and
      the half shell section forms an inner wall of a semi-arcuate hollow body curved in the manner of a semi-arc around the second gearwheel axis.

2. The transmission device as claimed in claim 1, wherein the first side face of the orifice segment comprises a conical or funnel-shaped surface which is aligned radially with respect to the first gearwheel axis.

3. The transmission device as claimed in claim 1, wherein the distance between the outer rim of the first orifice segment and the first axis is greater than the inner circle of the first gearwheel, and in that a contour of the outer rim of the first orifice segment is of complementary design to an inner contour of the adjacent bottom region.

4. The transmission device as claimed in claim 1, wherein the first orifice segment extends around the first gearwheel axis in the manner of a continuous flat annular disk.

5. The transmission device as claimed in claim 1, wherein the first orifice segment forms an inner collar, which extends in a direction away from the first gearwheel toward a bearing device, which supports a transmission component carrying the first gearwheel.

6. The transmission device as claimed in claim 1, wherein the first gearwheel fits around an axle differential, wherein this axle differential is a spur gear differential.

7. The transmission device as claimed in claim 1, wherein the oil guidance structure is arranged in an intermediate region between the first gearwheel and the first side wall region of the transmission housing.

8. A transmission device comprising:
   a transmission housing having a bottom region, a first side wall region, and a second side wall region;
   a gear set in the transmission housing having
      a first gearwheel which is rotatable about a first axis and has a center hole having a radius, and
      a second gearwheel engaging the first gearwheel and rotatable about a second axis; and
   an oil guide having an orifice segment, which extends at least partially around the first axis and includes a first side face facing the first gearwheel and spaced from the first gearwheel by an intermediate space, the orifice segment having an inner rim circumscribing the first axis and an outer rim, wherein a distance between the inner rim and the first axis is smaller than the radius of the center hole of the first gearwheel;
   wherein the orifice segment is adjoined by a second orifice segment which extends around the second axis in the manner of a continuous ring;
   wherein the second orifice segment carries a half shell section which extends from the second orifice segment in a direction of the second axis and which bounds a tip circle of the second gearwheel while leaving an intermediate space; and wherein the half shell section forms an inner wall of a semi-arcuate hollow body curved in the manner of a semi-arc around the second axis.

9. The transmission device as claimed in claim 8, wherein the first side face of the orifice segment comprises a conical or funnel-shaped surface which is aligned radially with respect to the first axis.

10. The transmission device as claimed in claim 8, wherein the distance between the outer rim of the orifice segment and the first axis is greater than the center hole of the first gearwheel, and in that a contour of the outer rim of the orifice segment is of complementary design to an inner contour of the adjacent bottom region.

11. The transmission device as claimed in claim 8, wherein the orifice segment extends around the first axis in the manner of a continuous flat annular disk.

12. The transmission device as claimed in claim 8, wherein the orifice segment forms an inner collar, which extends in a direction away from the first gearwheel toward a bearing device, which supports a transmission component carrying the first gearwheel.

13. The transmission device as claimed in claim 8, wherein the first gearwheel fits around an axle differential, wherein this axle differential is a spur gear differential.

14. The transmission device as claimed in claim 8, wherein the oil guide is arranged in an intermediate region between the first gearwheel and the first side wall region of the transmission housing.

\* \* \* \* \*